US010205597B2

(12) United States Patent
Ali et al.

(10) Patent No.: US 10,205,597 B2
(45) Date of Patent: Feb. 12, 2019

(54) COMPOSITE DOCUMENT REFERENCED RESOURCES

(71) Applicant: HEWLETT-PACKARD DEVELOPMENT COMPANY, L.P., Houston, TX (US)

(72) Inventors: Vali Ali, Houston, TX (US); Helen Balinsky, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 18 days.

(21) Appl. No.: 15/308,324

(22) PCT Filed: Jun. 30, 2014

(86) PCT No.: PCT/US2014/044955
§ 371 (c)(1),
(2) Date: Nov. 1, 2016

(87) PCT Pub. No.: WO2016/003431
PCT Pub. Date: Jan. 7, 2016

(65) Prior Publication Data
US 2017/0104599 A1      Apr. 13, 2017

(51) Int. Cl.
*G06F 3/0481* (2013.01)
*G06F 21/42* (2013.01)
(Continued)

(52) U.S. Cl.
CPC ............ *H04L 9/3247* (2013.01); *G06F 21/10* (2013.01); *G06Q 10/10* (2013.01); *H04L 9/14* (2013.01);
(Continued)

(58) Field of Classification Search
CPC ....... H04L 9/3247; H04L 67/02; H04L 63/06; H04L 9/30; H04L 9/14; G06Q 10/10; G06F 21/10; G06F 2221/07
See application file for complete search history.

(56) References Cited

U.S. PATENT DOCUMENTS 6,154,840 A    11/2000  Pebley et al.
6,973,445 B2   12/2005  Tadayon et al.
(Continued)

FOREIGN PATENT DOCUMENTS

CN      101689238 A    3/2010
CN      101944087      1/2011
(Continued)

OTHER PUBLICATIONS

Adobe Systems Incorporated; "Security Methods for the Acrobat Family of Product"; May 16, 2012; 122 pages.
(Continued)

*Primary Examiner* — Fatoumata Traore
(74) *Attorney, Agent, or Firm* — HPI Patent Department

(57) ABSTRACT

According to one example, a method is described in which a computer system receives a composite document with at least one referenced resource location. The computer system decrypts the referenced resource location, determines if the referenced resource location requires loading, and determines if the referenced resource location is editable. In the event that the referenced resource location requires loading, the referenced resource may be loaded from the referenced resource location and decrypted. In the event that the referenced resource location is editable, the referenced resource location may be edited.

19 Claims, 5 Drawing Sheets

(51) Int. Cl.
*H04L 9/32* (2006.01)
*G06F 21/10* (2013.01)
*H04L 9/14* (2006.01)
*H04L 9/30* (2006.01)
*H04L 29/06* (2006.01)
*G06Q 10/10* (2012.01)
*H04L 29/08* (2006.01)

(52) U.S. Cl.
CPC ............... *H04L 9/30* (2013.01); *H04L 63/06* (2013.01); *H04L 67/02* (2013.01); *G06F 2221/07* (2013.01)

(56) References Cited

U.S. PATENT DOCUMENTS

| | | | |
|---|---|---|---|
| 7,249,314 | B2 | 7/2007 | Walker et al. |
| 7,257,706 | B1 | 8/2007 | Zucker |
| 8,074,215 | B2 | 12/2011 | Cohen et al. |
| 8,086,946 | B2 | 12/2011 | McQuarrie et al. |
| 8,132,261 | B1 | 3/2012 | Simpson et al. |
| 8,370,529 | B1 | 2/2013 | Hansen |
| 8,458,273 | B2 | 6/2013 | Graham et al. |
| 2004/0128535 | A1* | 7/2004 | Cheng ................ G06F 21/6209 380/285 |
| 2007/0250495 | A1* | 10/2007 | Belinsky ........... G06F 17/30663 |
| 2008/0005024 | A1 | 1/2008 | Kirkwood |
| 2011/0035811 | A1 | 2/2011 | Rees et al. |
| 2012/0089841 | A1* | 4/2012 | Boyer .................... G06F 21/64 713/175 |
| 2012/0185701 | A1* | 7/2012 | Balinsky ............. G06F 21/6209 713/193 |
| 2012/0317239 | A1 | 12/2012 | Mulder et al. |

FOREIGN PATENT DOCUMENTS

| | | |
|---|---|---|
| CN | 102611732 | 7/2012 |
| CN | 102629307 | 8/2012 |
| JP | 2003-6113 A | 1/2003 |
| JP | 2003006113 | 1/2003 |
| KR | 1020080005785 A | 1/2008 |
| TW | 200816009 A | 4/2008 |
| TW | 201131401 A | 9/2011 |

OTHER PUBLICATIONS

Kim S et al: "Architecture and data model of webday-based collaborative system", Proc. of the 2004 Int'l Symp on Collaborative Technologies and Systems, Jan. 18-23, 2004 San Diego California pp. 48-55.

* cited by examiner

COMPOSITE DOCUMENT REFERENCED RESOURCES

BACKGROUND

The creation, distribution, and exchange of digital documents has become a commonly accepted alternative to printing documents, both for purposes of efficiency and for environmental purposes. Examples of digital documents that may be created, distributed, or otherwise exchanged include, for instance electronic word processing documents, electronic spreadsheets, electronic presentations, electronic drawings, portable document format (PDF) files, and web pages, e.g., HTML, CSS, or other web format files. Digital documents may range in file size from a small number of bytes to a large number of terabytes or more.

Many digital documents have become a mixture, or a composite, of separate parts created in differing file formats. Different parts may be combined together through various serialization mechanisms such as a Java jar-archive, or an HP DLF file. One example of a composite document is a business proposal document including product images as JPEG files, a marketing video clip as a MOV file, a PowerPoint presentation as a PPT file, and a financial details spreadsheet as an XLS file. Composite documents may be presented to a user through specialized software as a single editable, browsable, searchable, approvable, or usable document.

DETAILED DESCRIPTION

Figure 1:
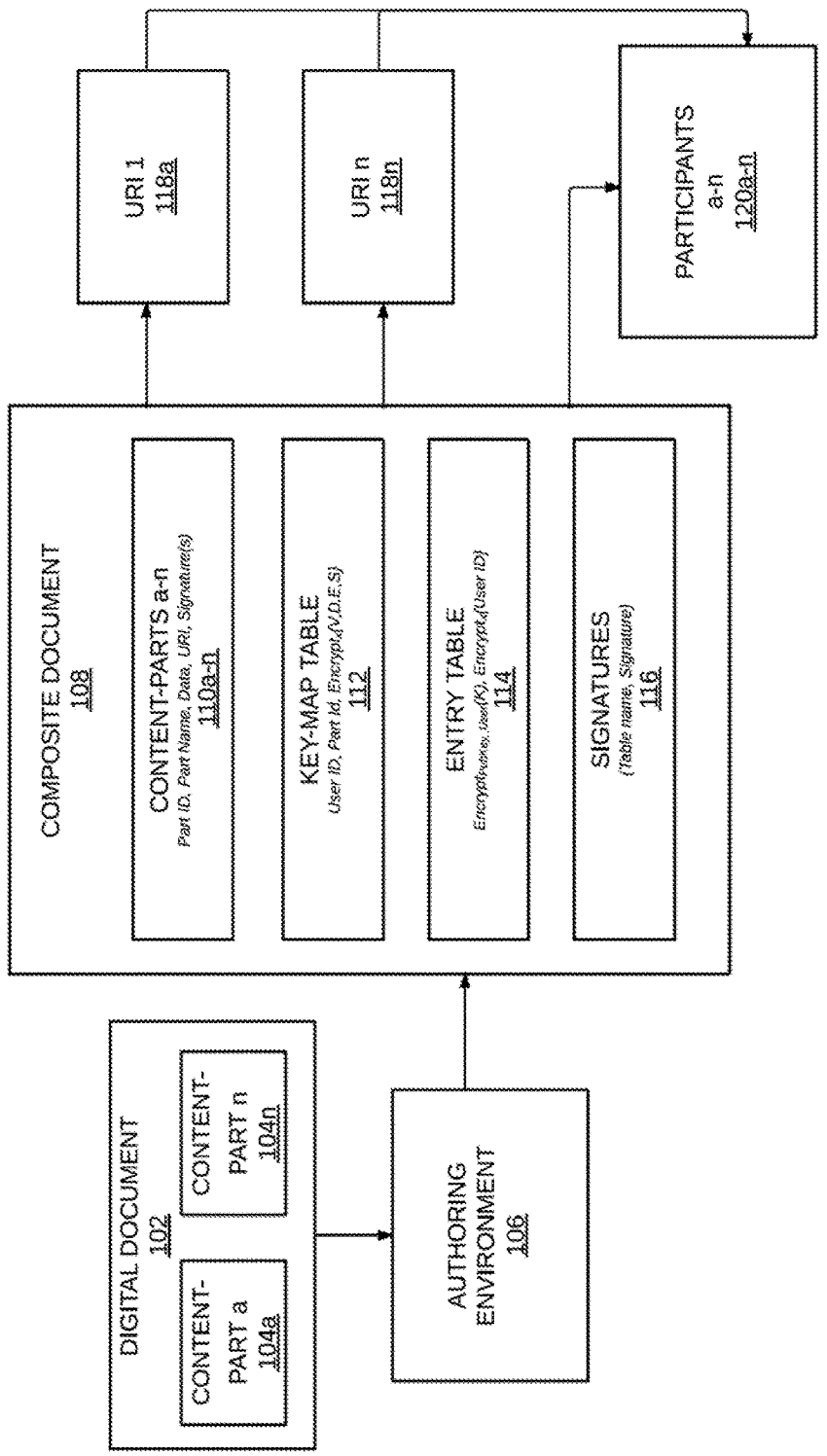
FIG. 1 illustrates a simplified block diagram of a digital document workflow, according to an example of the present disclosure.

In an example, a composite document, an authoring environment, a secure content manager, and a method for accessing one or more secure content-parts of a composite document with referenced locations, i.e., referenced resources, are disclosed.

More specifically, in some examples, the systems and methods disclosed herein generally enable a composite document to be created, accessed, loaded, and/or edited with one or more content-parts of the composite document stored in referenced locations instead of embedded into the composite document. For example, a composite document may comprise one or more referenced locations as a uniform resource identifier ("URI"), uniform resource locator ("URL"), file path, or other pointer to data external to the composite document, i.e., not embedded into the composite document. In some examples, in addition to referenced resources, other content-parts of the composite document may be embedded into the composite document. In other examples, a content-part may be both stored as a referenced resource and embedded. In such cases, the most recent version of a content-part may be used when accessed by a participant.

As used throughout the present disclosure, a composite document may comprise a digital document that contains content-parts that have been encrypted and signed to substantially prevent unauthorized access to the content-parts. The content-parts may comprise a variety of individually addressable and accessible parts in the form of separate files or addressable file fragments. For example, the units may include individual files, groups of files, or file fragments including, e.g., HTML tags, XML nodes and elements, word processing pages, spreadsheet cells, presentation slides, an electronic object containing drawings, an electronic object having video capabilities, etc., and/or combinations of different types of file parts. In some examples, a composite document may be a folder, container, grouping, or other data structure.

In one example, a composite document may be publicly-posted. e.g., at a public location or on a public server, or with a public level of access. For example, a composite document may be on a public server but not be publicly accessible, or vice versa. In another example, a composite document may be used, e.g., privately or internally within an enterprise, and/or in mixed workflows (inter or intra-organization).

Referenced locations such as a URI within a composite document may eliminate redundant downloads and uploads, reducing overall traffic and improving propagation of a composite document along a workflow. Referenced locations may also restrict unnecessary downloads of content-parts for which as particular workflow participant (or "participant" or "user") does not have read access, or in the case where a participant does not have a device that qualifies for access to a content-part, such as a device incapable of accessing a particular file type such as a multimedia file. Referenced locations may also provide immediate access to some elements of a composite document, i.e., a Table of Contents, while downloading other content-parts successively or at a later time, e.g., when needed or when requested. Referenced locations may also allow for editing of content-parts amongst workflow participants without the exchange of, e.g., embedded content-parts. Referenced locations may also allow for versioning, or version-dependent access, where the policy permits access to a certain version for a particular workflow participant, e.g., a beta document for an employee or developer, while a stable version is accessed by an end-user.

In an example, various attributes, either of a particular participant or particular composite document, may be used to determine if a referenced location is downloaded immediately upon access to the composite document or, e.g., only when a participant requests access to the particular content-part. Such attributes may relate to, for example, a loading preference e.g., "lazy loading" or "eager loading"); whether a participant has read and/or write access; device qualifications, e.g., whether a participant's device is capable of downloading a particular content-part stored in a referenced location; and/or bandwidth qualifications, e.g., whether a participant's network connection is capable of downloading a particular content-part stored in a referenced location.

FIG. 1 illustrates a simplified block diagram of a digital document workflow, according to an example of the present disclosure. It should be understood that the diagram depicted in FIG. 1 represents a generalized illustration and that other components may be added, or existing components may be removed, modified, or rearranged without departing from the overall scope of the digital document workflow 100.

The digital document workflow 100, in an example, includes a digital document 102, an authoring environment 106, a composite document 108, participants 120a-n, and referenced locations 118a-n. Referenced locations 118a-n are depicted as URIs but as mentioned previously, may be a URI, a file path, or other pointer to data external to the composite document, i.e., data not embedded into the composite document.

Composite document 108 is depicted as containing an exemplary plurality of secure content-parts 110a-n and an exemplary plurality of encrypted key-map entries in a key map table 112. As used herein, the term "secure" is intended to denote that the content-parts 110a-n and the key-map entries in the key map table 112 are encrypted and/or signed.

The key map table 112 may comprise one or more rows for each resource, e.g., each content-part. For example, key map table 112 may include rows for a content-part that is embedded, referenced, and embedded and/or referenced. A type field may be used in key map table 112 to define whether a particular row relates to a content-part that is embedded or referenced, and permissions may indicate the read, write, or modify access level for a particular content-part. Permissions or access controls may be expressed ID key map table 112. Key map table 112 may include fields such as a user ID, a part ID, a type, a signature verification key, a decryption key, an encryption key, and/or a signature key.

In various examples, key map table 112 may represent permissions that, e.g., allow a participant with read-only access to read a URI and retrieve a content-part; allow a participant with read/write access to a URI to modify a URI to place a content-part into a new location; allow a participant with read/write access to a content-part only to modify a content-part but not a URI; allow a participant with read/write access to a URI only to modify a URI but not a content-part; allow a participant with read/write access to a URI to export a referenced resource; or allow a participant with read/write access to a URI to convert a referenced resource into an embedded content-part.

Content-parts 104a-n, in an example, may represent individually addressable or separable elements within digital document 102. For example, content-parts 104a-n may be lines, paragraphs, text boxes, cells, rows, columns, graphics, or other objects such as a fillable text field or signature box. The content-parts 104a-n may also be extended to the byte level, for instance, as different elements of the same file. As another example, the content-parts 104a-n may comprise logical aggregations of parts from multiple digital documents.

Each of content-parts 104a-n may be stored within the digital document 102 or on, e.g., a computer, server, web server, storage device, cloud service, or other device or service external to the digital document 102.

In an example, authoring environment 106 may package, encrypt, and sign the content-parts 104a-n of digital document 102 such that participants 120a-n are unable to access the resulting secure content-parts 110a-n (in master form) unless the participants 120a-n have the appropriate keys to access the secure content-parts 110a-n (in distribution form). More specifically, authoring environment 106 may generate, or derive, needed encryption and signature keys to encrypt and sign the content-parts 104a-n into secure content-parts 110a-n. Moreover, in an example, participants 120a-n may be required to use different sets of keys to read and/or write to composite document 108.

In addition, authoring environment 106 may create or generate referenced locations, e.g., URIs, for content-parts 110a-n that are, or will be, stored external to composite document 108 instead of embedded. Authoring environment 106 may also allow for the creation or editing of attributes associated with a particular referenced location for a content-part, such as loading attributes, and may embed such attributes into the composite document 108. Loading attributes, such as whether or not to immediately display a content-part, may be stored, e.g., in the composite document, or external to the composite document.

Referenced locations, e.g., a URI such as URIs 118a-n, may be stored in content-parts 110a-n, or within a table or other storage mechanism associated with content-parts 110a-n which may be resolved, e.g., with a pointer. For example, a content-parts 110a-n table may comprise a part ID, a part name, a referenced location such as a URI (or the embedded data, if not a referenced resource), and at least one signature.

Composite document 108, in an example, may also comprise an exemplary plurality of encrypted key-map entries in a key map table 112. Access, including read/write permissions, to secure content-parts 110a-n by participants 120a-n may be controlled through distribution of various sets of keys contained in respective key-map entries in key map table 112 for the participants. More particularly, a subset of the entries may be contained in key-map entries within a composite document, with at least one key-map entry for each participant.

Data stored in entry table 114 and signatures 116 may comprise additional information needed to decrypt, encrypt, verify, or otherwise authenticate secure content-parts of composite document 108. As mentioned above, the various secure content-parts may be combined together through various serialization mechanisms, such as a Java jar-archive, an HP DLF file, or other file types.

Participants 120a-n may represent computing devices through which participants 120a-n receive or initially access a composite document 108. When granted sufficient access, participants 120a-n may also view, edit, copy, print, and/or acknowledge receipt of a composite document 108. The computing devices may comprise, for instance, personal computers, desktop computers, laptop computers, tablet computers, personal digital assistants, cellular telephones, smartphones, retail points of sale, workstations, gaming devices, scientific instruments, and consumer electronic devices.

Composite document 108 may be supplied to and among the participants 120a-n through, for instance, e-mail, a shared server, direct file transfer, removable storage medium, or cloud service, etc. Referenced locations, e.g., URIs 118a may be accessed directly by the composite document 108, or may be accessed via a secure content manager, e.g., the secure content manager 220 of FIG. 2 discussed in more detail below.

Figure 2:
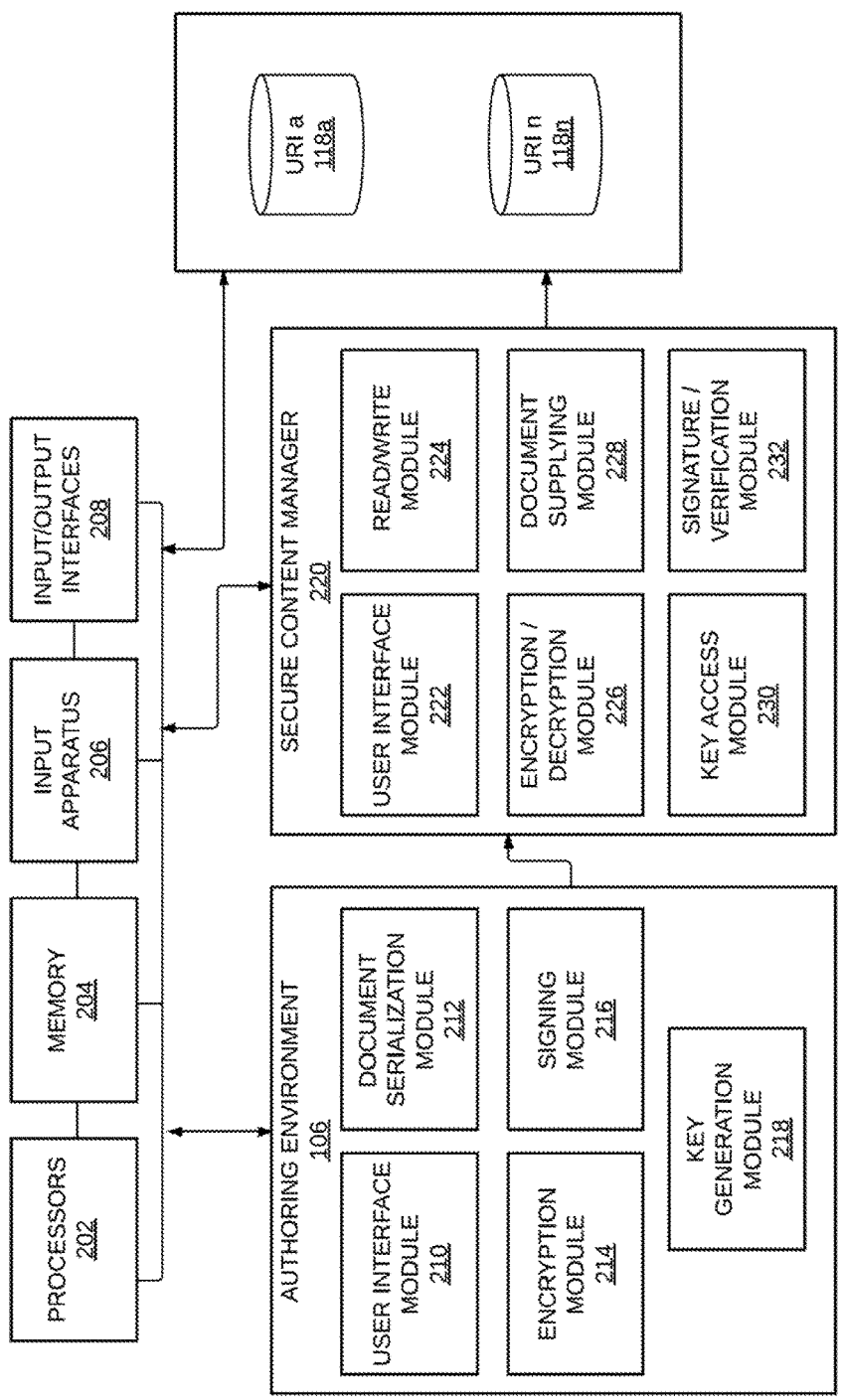
FIG. 2 illustrates a simplified block diagram of a digital document system including an authoring environment, a secure content manager, and referenced resource or content-parts.

FIG. 2 illustrates a simplified block diagram of a digital document system including an authoring environment, a secure content manager, and referenced content-parts, according to an example of the present disclosure.

It should be understood that the block diagram depicted in FIG. 2 represents generalized illustrations and that other components may be added, or existing components removed, modified, or rearranged, without departing from the scope of the systems of FIG. 2.

As shown in FIG. 2, authoring environment 106, discussed above, may include, in an example, a user interface module 210, a document serialization module 212, an encryption module 214, a signing module 216, and a key generation module 218. Aside from the other operations of an authoring environment, including those discussed herein, the modules may support a user interface, serializing content-parts of a composite document into a composite document, encrypting content-parts or an entire composite document, signing content-parts or an entire composite document, and generating keys for use in a composite document.

In an example, secure content manager 220 allows participants 120a-n to access secure content-parts of a composite document 108. For example, secure content manager 220 may comprise or include a front-end software tool or graphical user interface ("GUI") for accessing a composite document 108.

In an example, secure content manager 220 receives a composite document 108 through the workflow of participants 120a-n. It will be understood that secure content manager 220 may be positioned between any of the participants 120a-n in the workflow as well as between multiple participants 120a-n.

It will also be understood that, in an example, secure content manager 220 may receive composite document 108 more than once during a workflow, as is the case for participants 120a-n. In contrast to participants 120a-n, however, the secure content manager 220 need not read or edit the secure content-parts 110a-n of the composite document 108.

Secure content manager 220 may authenticate a participant; establish a corresponding trusted public key for a participant; function as a document security and safety checkpoint; backup the composite document 108 at various points along the workflow; timestamp the composite document 108 at various points along the workflow; scan a part of the composite document 108 that is exclusively accessible by the secure content manager 220 to determine if composite document 108 is in compliance with the security compliance rules; and perform other functions between authoring environment 106, participants 120a-n, and referenced location servers 118a-n.

In an example, secure content manager 220 may also access or read attributes relating to whether location references are to be created or, once created, whether they are to be accessed or loaded. In various examples, different attributes may be assigned for each participant 120a-n, for different groups of participants, or for all workflow participants. Attributes can be joined by OR/AND operators, or may default to an AND operator. Secure content manager 220 may also access key map table 112 to determine read/write access or permission levels for a particular participant or content-part.

Secure content manager 220 may include, in an example, a user interface module 222, a document read/write module 224, encryption/decryption module 226, a document supplying module 228, a key access module 230, and a signature/verification module 232. Aside from the other operations of a secure content manager, including those discussed herein, the modules may support a user interface, reading and writing or re-writing content-parts of a composite document into a composite document after editing, encrypting and decrypting content-parts or an entire composite document, supplying or presenting content-parts or an entire composite document, accessing keys for use in a composite document, and/or signing or verifying.

Referenced location servers 118a-n, in an example, may include any content-parts referenced in a composite document 108. For example, referenced location server 118a may be a web server, shared storage, a sharing service, or online cloud storage for storing a document, while referenced location server 118b may be a media server storing a movie file. In one example, referenced location server 118c may store Flash content which may, or may not, be playable on a particular participant device, as discussed below in more detail. It will be understood that the referenced location servers 118a-n may comprise disk storage systems or arrays, or other storage, functioning as data servers.

The authoring environment 106, secure content manager 220, and referenced locations servers 118a-n may be implemented and/or executed by a respective processor or processors 202, which may be coupled to one or more memories 204, input apparatus 206, and input/output interfaces 208. Thus, for instance, authoring environment 106 may comprise an integrated and/or add-on hardware device of a computing device comprising a processor 202. As another example, the secure content manager 220 may comprise a computer readable storage device upon which machine readable instructions for each of the modules 222-232 are stored and executed by a processor 202, which may be coupled to a memory 204.

In an example, referenced location servers 118a-n may comprise a hard disk or solid state disk, or volatile and/or non-volatile memory, such as DRAM, EEPROM, MRAM phase change RAM (PCRAM), Memristor, and flash memory, etc.

The authoring environment 106, secure content manager 220, and referenced location servers 118a-n may communicate directly with each other, or through input/output interfaces, e.g., interfaces 208, through the use of tokens or keys, or other means of digital communication.

Figure 3:
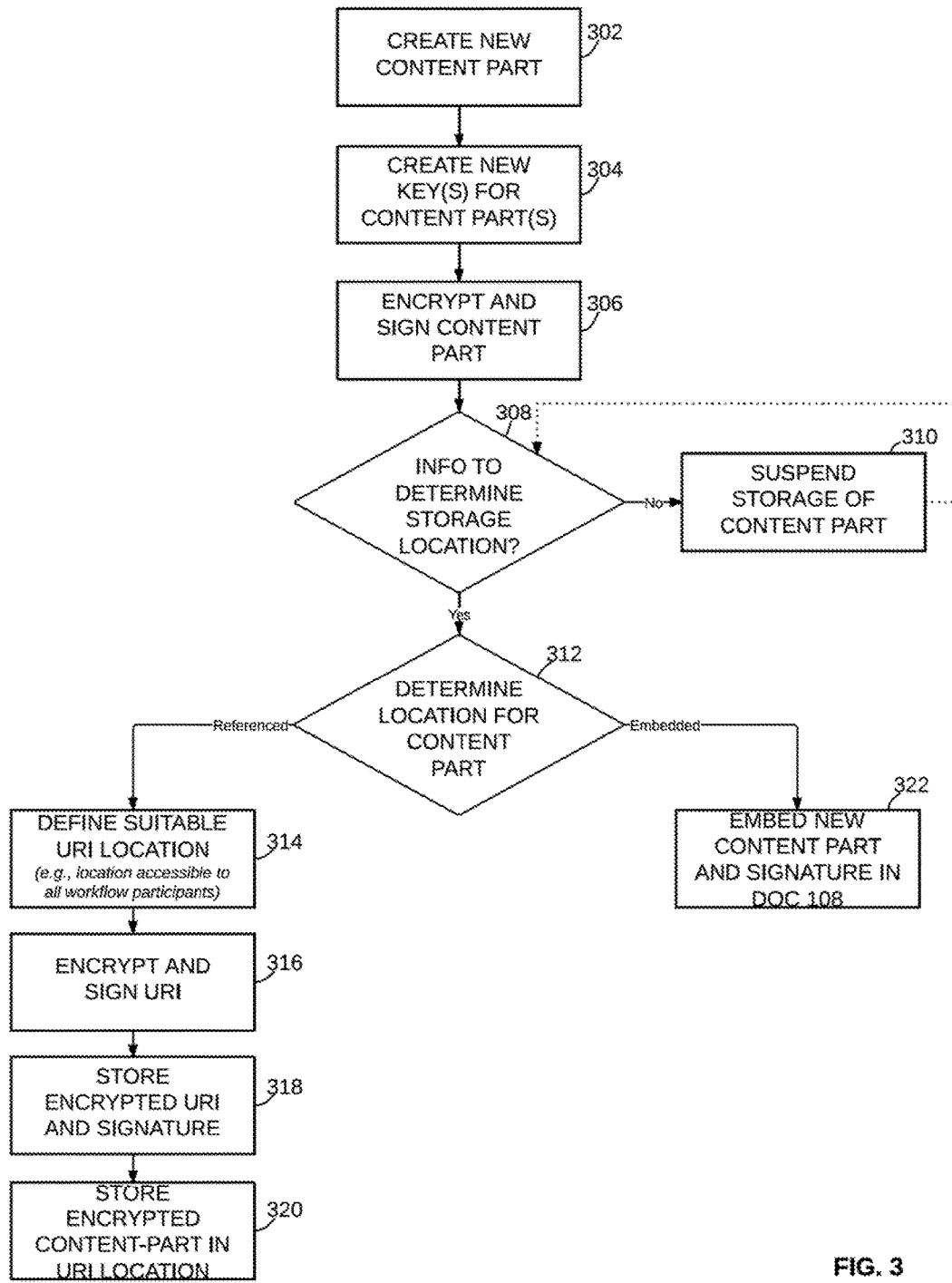
FIG. 3 illustrates a flow diagram of a method for storing content-parts for a composite document, according to an example of the present disclosure.

FIG. 3 illustrates a flow diagram of a method for storing content-parts for a composite document, according to an example of the present disclosure.

In an example, in block 302, a new content part, e.g., content part 104a-n, is created or imported by, e.g., authoring environment 106. In block 304, new keys are created for the content part by, e.g., secure content manager 220. In block 306, the content part is encrypted and signed by, e.g., secure content manager 220, using, e.g., a part-specific key.

In block 308, a determination is made as to whether sufficient information has been received to determine a preferred storage location for the new content part. In an example, secure content manager 220 can store the content part within the composite document 108 by, e.g., embedding it into composite document 108, or secure content manager 220 can store the content-part externally, e.g., on a server or other location, and store only a referenced location to the resource in composite document 108. The decision of block 308 may be based on known attributes of either composite document 108 or attributes related to any of workflow participants 120a-n.

In block 310, if sufficient information is not available to determine where to store a new content part, the storage may be suspended, e.g., secure content manager 220 may store the content-part locally in a temporary location. In such a case, flow may return to block 308 when sufficient information is available to determine where to store a new content part.

In block 312, if sufficient information is available to determine where to store a new content part, flow may proceed to either block 314, where content-parts are stored external to composite document 108, or to block 322, where content-parts are embedded in composite document 108.

In block 314, for content-parts that are stored external to composite document 108, e.g., on referenced location servers 118a-n, a URI location is determined. In an example, a location may be determined based on attributes such as locations that are accessible to all workflow participants requiring access to a particular content-part. For example, it may be determined that storing a content part in London is a suitable location for workflow participants determined to be located throughout Europe. In another example, content-parts that only need to be accessed within a business organization may be at an internal URI.

In block 316, the URI of the determined location is encrypted and signed. For example, the URI may be a uniform resource locator of a particular website including a prefix, a website name, and a top-level domain, and/or a file path with or without variables such as a username, password, or unique identifier, etc. within the a string. In an example, the table of content-parts 110a-n is then updated in block 318 with a part ID, a part name, the URI, and at least one signature, e.g., the URI signature and the part signature. In block 320, the encrypted content-part is then stored in the reference location, e.g. at URI location 118a-n. In some examples, the content-part may not be encrypted, e.g., when a particular content-part is not confidential.

In block 322, for content-parts that are embedded into composite document 108, the content-part is embedded along with a signature for the content part. In an example, the table of content-parts 110a-n is updated with a part ID, a part name, the embedded data, and at least one signature.

Figure 4:
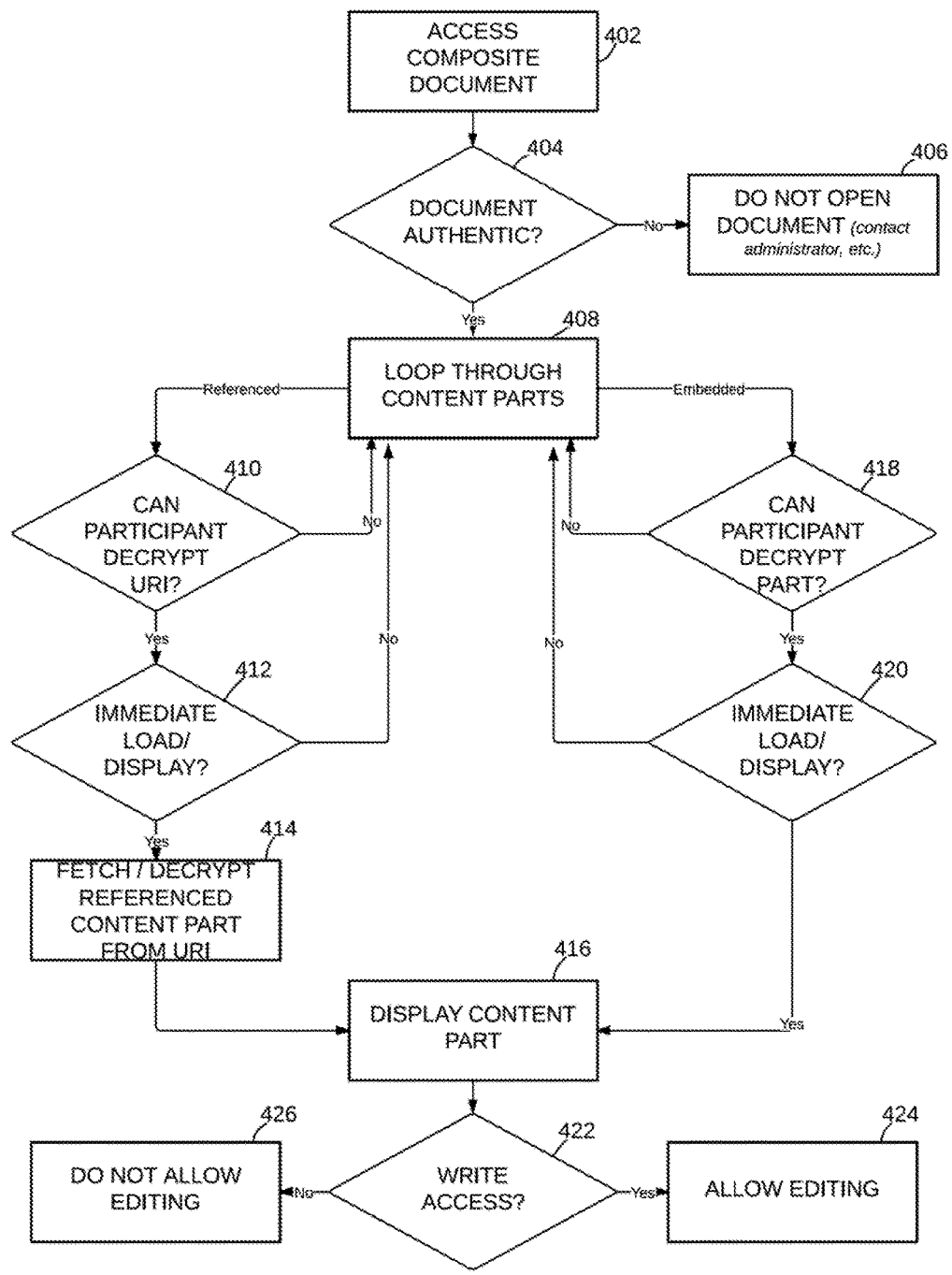
FIG. 4 illustrates a flow diagram of a method for accessing content-parts of a composite document, according to an example of the present disclosure.

FIG. 4 illustrates a flow diagram of a method for accessing content parts of a composite document, according to an example of the present disclosure. In block 402, a composite document 108 is received or accessed by, e.g., secure content manager 220 following, e.g., a request from a workflow participant.

In block 404, a determination is made as to whether the authenticity of the composite document 108 may be verified. Verification of authenticity may be based on, e.g., a signature or other means of verification. If the authenticity cannot be verified, secure content manager may not attempt to open composite document 108, and in block 406 an error message or other indication may be displayed or transmitted to a workflow participant. In some examples, verification of authenticity may not be required. In such examples, a participant may be prompted to specify whether the participant wishes to open the composite document that has not been authenticated.

In block 408, if the authenticity of composite document 108 can be verified, processing continues for each of the content-parts in composite document 108 based on whether a content-part is referenced or embedded. It will be understood that elements of FIG. 4 may loop for composite documents that contain more than one content-part.

In block 410, for each content-part that is a referenced resource, e.g., stored external to composite document 108, in an example, a determination is made as to whether the workflow participant has access to the content-part, e.g., whether the URI can be decrypted with a corresponding content-part key provided to a workflow participant within the participant's key-map file. If the URI cannot be decrypted, the flow returns to block 408.

If the URI can be decrypted, flow continues to block 412 where a determination is made as to whether the content-part associated with the URI is to be immediately displayed or transmitted to the workflow participant. If the content-part associated with the URI is not to be immediately displayed, e.g., if the workflow participant will access the content-part associated with the URI at a later time, flow returns to block 408. In some examples, defaults may be set for a particular device. For example, a participant's mobile device may be set to not display any content-parts by default, or to not display certain file types, e.g., multimedia clips, immediately.

A determination as to whether a referenced content-part is to be immediately displayed may be based on an attribute, such as composite document or workflow participant attributes, e.g., detailed read/write/access permissions, available bandwidth, or device settings or capabilities. In other words, secure content manager 220, in an example, downloads only the referenced location content-parts necessary for a particular participant 120a-n. Such an attribute may be deemed either "lazy loading" and/or "eager loading" in some examples to, e.g., optimize bandwidth usage and efficiency. Such efficiencies may be particularly critical in a mobile environment, and/or when a composite document contains both text and heavy-use of multimedia.

For example, with either embedded or referenced resources, a determination may be made as to whether a device of a workflow participant is configured to receive, process, display, execute, or "play" a particular content-part. According to one example, if the content-part is a Flash movie, the secure content manager 220 may determine if the participant device 120a-n is capable of playing Flash movies. If not, the reference may not be accessed, downloaded, or loaded.

In the event that the content-part associated with a URI is to be immediately displayed, the content-part is retrieved or fetched from the URI in block 414 and displayed in block 416. In some examples, the content-part is decrypted after being fetched. It will be understood that the URI itself may be a referenced location, reflector mechanism, automatic redirect, or other referral mechanism, such that the URI location fetches content from other sources and returns the fetched content to secure content manager 220.

In block 422, a participant's key map table is checked to determine if a participant has write access to either the content-part, the URI, or both. If so, a participant may edit the content part, the URI, or both in block 424. In one example, a participant with write access to a URI may convert an embedded content-part into a referenced resource, e.g., using the process for creating a referenced resource discussed above. In another example, a participant with write access may convert a referenced resource into an embedded content-part by deleting a URI and embedding the content-part accordingly. In yet another example, a participant with write access to a URI may modify a URI with a new referenced resource location, moving the content-part to the new referenced resource location. In cases where the participant does not have write access, flow may proceed to block 426.

In block 418, for each content-part that is an embedded resource, e.g., stored internal to composite document 108, in an example, a determination is made as to whether the workflow participant has access to the content-part, e.g., whether the content-part can be decrypted with a key of the workflow participant. If the content-part cannot be decrypted, the flow returns to block 408.

If the content-part can be decrypted, flow continues to block 420 where a determination is made as to whether the content-part is to be immediately displayed or transmitted to the workflow participant. If the content-part is not to be immediately displayed, e.g., it the workflow participant will access the content-part at a later time, flow returns to block 408. In the event that the content-part is to be immediately displayed, the content-part is displayed in block 416.

As above, a determination as to whether an embedded content-part is to be immediately displayed may be based on an attribute, such as composite document or workflow participant attributes. In other words, secure content manager 220, in an example, opens only the referenced location content-parts necessary for a particular participant 120a-n. Similarly, as above, flow may proceed to block 422 for editing if a participant has write access.

Figure 5:
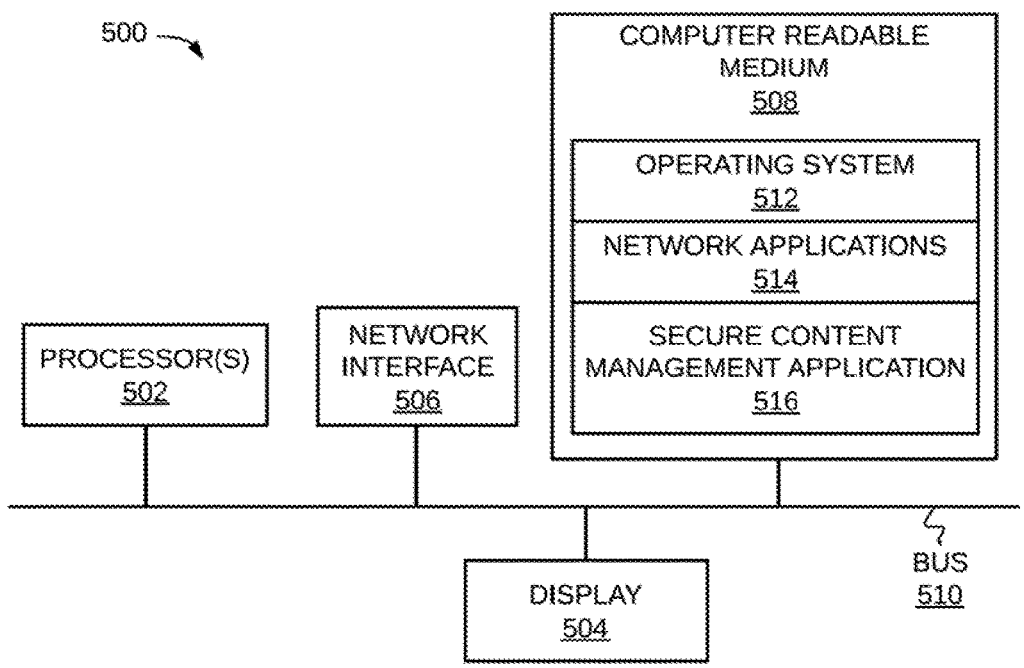
FIG. 5 illustrates a schematic representation of a computing device that may be used as a platform for implementing or executing at least one of the processes depicted in FIGS. 3 and 4, according to an example of the present disclosure.

FIG. 5 illustrates a schematic representation of a computing device that ma be used as a platform for implementing or executing at least one of the processes depicted in FIGS. 3 and 4, according to examples of the present disclosure.

Some or all of the operations set forth in the figures may be contained as a utility, program, or subprogram, in any desired computer readable storage medium. In addition, the operations may be embodied by machine-readable instructions. For example, they may exist as machine-readable instructions in source code, object code, executable code, or other formats. Any of the above may be embodied on a computer readable storage medium, which include storage devices.

Examples of computer readable storage media include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Computing device 500 may represent a computing device that comprises authoring environment 106, secure content manager 222, and/or referenced location servers 118a-n. The device 500 may include a processor 502 such as a central processing unit; a display device 504, such as a monitor or other digital display; a network interface 506, such as a Local Area Network LAN card, a wireless 802.11x LAN card, a 3G or 4G mobile WAN or a WiMax WAN card; and a computer-readable medium 508. Each of these components may be operatively coupled to a bus 510. For example, the bus 510 may be an EISA, a PCI, a USB, a FireWire, a NuBus, or a PDS.

The computer readable medium 508 may be any suitable medium that participates in providing instructions to the processor(s) 502 for execution. For example, the computer readable medium 508 may be non-volatile media, such as an optical or a magnetic disk, or volatile media, such as memory. Transmission media can also take the form of acoustic, light, or radio frequency waves. The computer readable medium 508 may also store other machine-readable instructions.

The computer-readable medium 508 may also store an operating system 512, such as Microsoft Windows, Mac OS, Unix, or Linux; network applications 514; and an access management application 516 such as secure content manager 220. The operating system 512 may be multi-user, multiprocessing, multitasking, multithreading, real-time, and the like. The operating system 512 may also perform basic tasks, such as recognizing input from input devices, such as a keyboard or a keypad; sending output to the display 504; keeping track of files and directories on medium 508; controlling peripheral devices, such as drives, printers, or image capture devices; and managing traffic on the bus 510. The network applications 514 may include various components for establishing and maintaining network connections, such as machine readable instructions for implementing communication protocols including TCP/IP, HTTP, Ethernet, USB, and FireWire.

The authoring environment 106, secure content manager 220, and/or referenced location servers 110a-n provide various machine readable instructions for managing access to secure content, as described above. In certain examples, some or all of the processes performed may be integrated into the operating system 512. In certain examples, the processes may be at least partially implemented in digital electronic circuitry, in computer hardware, in machine readable instructions (such as firmware and/or software), or in any combination thereof.

What has been described and illustrated herein are various examples of the present disclosure along with some of their variations. The terms, descriptions and figures used herein are set forth by way of illustration only and are not meant as limitations. Many variations are possible within the spirit and scope of the present disclosure, wherein the present disclosure is intended to be defined by the following claims, and their equivalents, which all terms are meant in their broadest reasonable sense otherwise indicated.

What is claimed is:

1. A computer-implemented method of accessing an encrypted composite digital document, said method comprising:
   receiving, through a graphical user interface of a display device in a computer system, the encrypted composite digital document with at least one referenced resource location stored in digital content parts of the encrypted composite digital document, wherein the digital content parts comprise any of text, image, and video data structures;
   decrypting the at least one referenced resource location;
   determining whether the at least one referenced resource location requires loading;
   determining whether the at least one referenced resource location is editable; and
   determining whether to immediately display the encrypted composite digital document on the display device upon receipt through the graphical user interface to improve computer bandwidth usage of the computer system based on whether a participant computing device that loads the reference resource location on the display device is capable of executing the digital content based on a network connection between the participant computing device and the computer system,
   wherein, (i) in the event that the at least one referenced resource location requires loading, fetching a referenced resource from the at least one referenced resource location and decrypting the referenced resource, and (ii) in the event that the at least one referenced resource location is editable, editing the at least one referenced resource location.

2. The computer-implemented method according to claim 1, wherein determining whether the at least one referenced resource location is editable comprises reading a key-map table to determine write permissions for a participant computing device.

3. The computer-implemented method according to claim 1, wherein editing the at least one referenced resource location comprises modifying a uniform resource identifier.

4. The computer-implemented method according to claim 1, wherein editing the at least one referenced resource location comprises modifying a file path.

5. The computer-implemented method according to claim 1, wherein editing the at least one referenced resource location comprises moving the at least one referenced resource location.

6. The computer-implemented method according to claim 1, wherein editing the at least one referenced resource location comprises deleting the at least one referenced resource location and embedding the referenced resource into the encrypted composite digital document.

7. The computer-implemented method according to claim 1, wherein determining whether the at least one referenced resource location requires loading comprises determining participant device qualification.

8. The computer-implemented method according to claim 1, wherein determining whether the at least one referenced resource location requires loading comprises determining participant computing device bandwidth qualification.

9. The computer-implemented method according to claim 1, comprising verifying an authenticity of the referenced resource using a signature verification key from a participant key-map table for the referenced resource.

10. A computer system comprising:
a computer hardware authoring module to define a referenced resource location in an encrypted composite digital document and editing permissions for the referenced resource location, wherein the referenced resource location is stored in digital content parts of the encrypted composite digital document, and wherein the digital content parts comprise any of text, image, and video data structures;
a display device comprising a graphical user interface to allow access to the encrypted composite digital document;
a computer hardware content module to receive, from a workflow participant computing device, at least one request to access the encrypted composite digital document, to decrypt a referenced resource location, to determine whether the referenced resource location requires loading, to determine whether the referenced resource location is editable, and to determine whether to immediately display the encrypted composite digital document on the display device upon receipt through the graphical user interface to improve computer bandwidth usage of the computer system based on whether a participant computing device that loads the reference resource location on the display device is capable of executing the digital content based on a network connection between the participant computing device and the computer system;
a computer hardware communications module to fetch a referenced resource from the referenced resource location;
a computer hardware editing module to edit the referenced resource location; and
a processor to implement the authoring module, the content module, the communications module, and the editing module.

11. The computer system according to claim 10, wherein determining whether the referenced resource location is editable comprises reading a key-map table to determine permissions for the participant computing device.

12. The computer system according to claim 10, wherein editing the referenced resource location comprises modifying a uniform resource identifier.

13. The computer system according to claim 10, wherein editing the referenced resource location comprises modifying a file path.

14. The computer system according to claim 10, wherein editing the referenced resource location comprises moving the referenced resource location.

15. The computer system according to claim 10, wherein editing the referenced resource location comprises deleting the referenced resource location and embedding the referenced resource into the encrypted composite digital document.

16. The computer system according to claim 10, wherein determining whether the referenced resource location requires loading comprises determining participant computing device qualification.

17. The computer system according to claim 10, wherein determining whether the referenced resource location requires loading comprises determining participant computing device bandwidth qualification.

18. The computer system according to claim 10, wherein an authenticity of the referenced resource is verified using a signature verification key from a participant key-map table for the referenced resource.

19. A non-transitory computer readable storage medium on which is embedded a computer program, said computer program to manage access to a secure content-part of an encrypted composite digital document, said computer program comprising a set of instructions to:
receive, through a graphical user interface of a display device in a computer system, the encrypted composite digital document with at least one referenced resource location stored in digital content parts of the encrypted composite digital document;
decrypt the at least one referenced resource location;
determine whether the at least one referenced resource location requires loading;
determine whether the at least one referenced resource location is editable; and
determine whether to immediately display the encrypted composite digital document on the display device upon receipt through the graphical user interface to improve computer bandwidth usage of the computer system based on whether a participant computing device that loads the reference resource location on the display device is capable of executing the digital content based on a network connection between the participant computing device and the computer system,
wherein, (i) in the event that the at least one referenced resource location requires loading, fetching a referenced resource from the at least one referenced resource location and decrypting the referenced resource, and (ii) in the event that the at least one referenced resource location is editable, editing the at least one referenced resource location.

* * * * *